(12) United States Patent
Chen

(10) Patent No.: US 11,735,136 B2
(45) Date of Patent: Aug. 22, 2023

(54) OUTPUT PARAMETER ADJUSTMENT METHOD EMPLOYING AMBIENT LIGHT DISTRIBUTION FIELD

(71) Applicant: GUANGDONG XIAYE HOUSEHOLD ELECTRICAL APPLIANCES CO., LTD, Guangdong (CN)

(72) Inventor: Ziping Chen, Guangdong (CN)

(73) Assignee: GUANGDONG XIAYE HOUSEHOLD ELECTRICAL APPLIANCES CO., LTD., Guangdong (CN)

( * ) Notice: Subject to any disclaimer, the term of this patent is extended or adjusted under 35 U.S.C. 154(b) by 110 days.

(21) Appl. No.: 17/309,938

(22) PCT Filed: Jan. 3, 2019

(86) PCT No.: PCT/CN2019/070300
§ 371 (c)(1),
(2) Date: Jul. 1, 2021

(87) PCT Pub. No.: WO2020/140240
PCT Pub. Date: Jul. 9, 2020

(65) Prior Publication Data
US 2022/0076646 A1     Mar. 10, 2022

(51) Int. Cl.
*G09G 5/00* (2006.01)
*G06T 7/90* (2017.01)
(Continued)

(52) U.S. Cl.
CPC ............... *G09G 5/003* (2013.01); *G06T 7/90* (2017.01); *H05B 47/10* (2020.01);
(Continued)

(58) Field of Classification Search
CPC .. G09G 5/003; G09G 5/10; G09G 2320/0626; G09G 2320/0666;
(Continued)

(56) References Cited

U.S. PATENT DOCUMENTS 9,406,166 B2 * 8/2016 Futterer ............... G02B 6/0016
2006/0086529 A1 * 4/2006 Corsaro ................... H01R 4/68
174/125.1

(Continued)

FOREIGN PATENT DOCUMENTS

CN     110998413 A   *   5/2018        G03H 1/2205
CN     108184076 A       6/2018
(Continued)

*Primary Examiner* — Wesner Sajous
(74) *Attorney, Agent, or Firm* — Welsh Flaxman & Gitler LLC

(57) ABSTRACT

An output parameter adjustment method employing an ambient light distribution field including: acquiring an environmental image of a background environment in a viewing angle range of a user; dividing the environmental image according to preset partitioning to obtain environmental sub-images; obtaining the illumination value of each environmental sub-image; splicing the illumination of all of environmental sub-images to obtain distributed illumination distribution information corresponding to the environmental image; obtaining a first illumination model corresponding to the illumination distribution information; querying a model-parameter list, to obtain a first adjustment parameter corresponding to the first illumination model; and adjusting, display parameters of a display screen of a user terminal and/or adjusting light compensation output parameters of a lighting compensation device according to the first adjustment parameter so that the display parameter of the display screen match an illumination state of the background environment in the viewing angle range of the user.

9 Claims, 1 Drawing Sheet

(51) Int. Cl.
*H05B 47/10* (2020.01)
*G09G 5/10* (2006.01)
*H04N 1/60* (2006.01)
*H04N 5/57* (2006.01)
*H04N 5/58* (2006.01)
*H04N 9/73* (2023.01)
*H04N 9/77* (2006.01)

(52) U.S. Cl.
CPC ............... *G06T 2207/10024* (2013.01); *G06T 2207/20021* (2013.01); *G09G 2320/0626* (2013.01); *G09G 2320/0666* (2013.01); *G09G 2360/144* (2013.01); *G09G 2360/16* (2013.01)

(58) Field of Classification Search
CPC ......... G09G 2360/144; G09G 2360/16; G09G 3/20; G09G 3/36; G09G 2360/145; G09G 2370/022; G06T 7/90; G06T 2207/10024; G06T 2207/20021; H05B 47/10; G06F 3/048; G06F 3/04847; H04N 1/6086; H04N 1/6091; H04N 5/235; H04N 5/2351; H04N 5/2354; H04N 5/57; H04N 5/58; H04N 9/73; H04N 9/77

USPC ........................................................ 345/589
See application file for complete search history.

(56) References Cited

U.S. PATENT DOCUMENTS

| | | | |
|---|---|---|---|
| 2006/0092182 | A1 | 5/2006 | Diefenbaugh et al. |
| 2007/0291483 | A1* | 12/2007 | Lys .......................... A01M 1/04 362/227 |
| 2016/0042531 | A1* | 2/2016 | Nolan .................... H05B 47/23 348/135 |
| 2018/0352626 | A1* | 12/2018 | Komanduri .............. G09G 3/32 |

FOREIGN PATENT DOCUMENTS

| | | | | |
|---|---|---|---|---|
| CN | 108551576 | A | | 9/2018 |
| CN | 108877741 | A | * | 11/2018 ............... G09G 5/10 |
| CN | 108877741 | A | | 11/2018 |
| CN | 108986726 | A | * | 12/2018 ............... G09G 5/10 |
| CN | 108986726 | A | | 12/2018 |
| CN | 109035183 | A | | 12/2018 |

\* cited by examiner

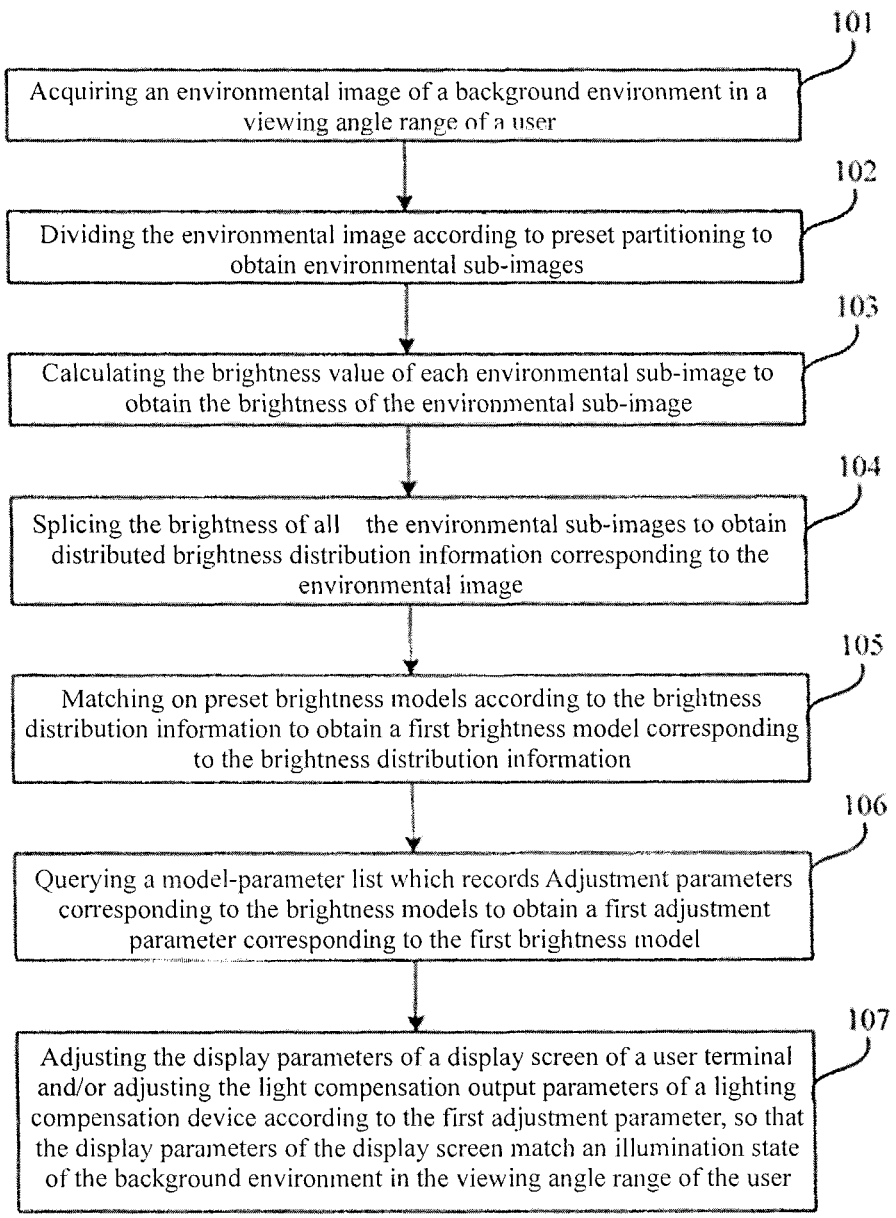

OUTPUT PARAMETER ADJUSTMENT METHOD EMPLOYING AMBIENT LIGHT DISTRIBUTION FIELD

BACKGROUND OF THE DISCLOSURE

1. Technical Field

The present disclosure relates to an output parameter adjustment method employing an ambient light distribution field, in particular to an output parameter adjustment method for realizing an ambient light distribution field according to the illumination of an environmental image.

2. Related Art

This era has seen constant emergence of various electronic devices. People spend most of their leisure time on computers, smart phones, televisions and other electronic devices. Besides, with the advancement of digital working and teaching, office workers and students spend a lot of time staring at computer screens and projection screens every day. After frequent and long-time looking at the display screens of mobile phones, computers and other terminals, eye strain can be caused, which further leads to decreased vision and affects visual health.

Mobile terminals (mobile phones), notebook computers, desktop computers, televisions, etc., are often used by people. However, the display screens of these electronic devices rarely have adaptive illumination. For example, most televisions and computers do not have adaptive illumination. Although mobile phones have an automatic illumination adjustment function based on a illumination sensor of the mobile phone, there are several problems in its adjustment mode.

1. At present, most smart phones with an automatic illumination adjustment mode detect the illumination of the background environment by identifying the ambient light with a illumination sensor, and then calculate the screen display illumination according to a preset algorithm; the illumination sensors of mobile phones are typically disposed on the front of mobile phones, that is, facing the users, while the visual background of the users faces the back of mobile phones; as a result, the illumination sensor can not truly perceive the background environment from the users' perspective, which is one limitation of the current automatic illumination adjustment method of display screens;

2. A light receiving surface of the illumination sensor of the mobile phone is very small, so the viewing angle for detecting the illumination of the environment is also very small, while the viewing angle range of human eyes is much larger, so the sensor cannot reflect the complete background illumination environment under the users' viewing angle;

3. The illumination adjustment of mobile phones is based on the light of the illumination sensor, so it is assumed the light is evenly distributed, but the reality is that the users' background light intensity cannot be uniform all the time, and the background used has illumination field distribution.

SUMMARY OF THE DISCLOSURE

In view of the defects of the prior art, the purpose of the present disclosure is to provide an output parameter adjustment method employing an ambient light distribution field, which can realize output parameter adjustment employing an ambient light distribution field after analyzing and processing the illumination of pixel points/pixel blocks of a background image.

To achieve the above purpose, the present disclosure provides an output parameter adjustment method employing an ambient light distribution field, which comprises the following steps:

Acquiring an environmental image of a background environment in a viewing angle range of a user;

Dividing the environmental image according to preset partitioning to obtain environmental sub-images;

Calculating the illumination value of each environmental sub-image to obtain the illumination of the environmental sub-image;

Splicing the illumination of all of the environmental sub-images to obtain distributed illumination distribution information corresponding to the environmental image;

Matching on preset illumination models according to the illumination distribution information illumination to obtain a first illumination model corresponding to the illumination distribution information;

Querying a model-parameter list which records adjustment parameters corresponding to the illumination models to obtain a first adjustment parameter corresponding to the first illumination model; and Adjusting display parameters of a display screen of a user terminal and/or adjusting the light compensation output parameters of a lighting compensation device according to the first adjustment parameter, so that the display parameters of the display screen match an illumination state of the background environment in the viewing angle range of the user.

Preferably, dividing the environmental image according to preset partitioning specifically comprises:

Acquiring image partitioning parameters;

Dividing the environmental image according to the image partitioning parameters; and Determining a corresponding model-parameter list according to the image partitioning parameters.

Preferably, matching on the preset illumination models according to the illumination distribution information illumination to obtain a first illumination model corresponding to the illumination distribution information specifically comprises:

Matching on the preset illumination models according to the illumination distribution information illumination to obtain one or more matching models and matching coefficients; and Performing model correction calculation based on each matching model and matching coefficient to obtain the first illumination model.

Further preferably, performing model correction calculation based on each matching model and matching coefficient to obtain the first illumination model specifically comprises:

Determining a matching model with the highest matching coefficient as a model to be corrected; and Conducting deviation correction calculation on the model to be corrected according to other models, except the matching model to be corrected, of the plurality of matching models and corresponding matching coefficients to obtain the first illumination model.

Further preferably, performing model correction calculation based on each matching model and matching coefficient to obtain the first illumination model specifically comprises:

Weighting the model parameters of the matching models according to the matching coefficients to obtain weighted model parameters; and Generating the first illumination model according to the weighted model parameters.

Further preferably, performing model correction calculation based on each matching model and matching coefficient to obtain the first illumination model specifically comprises:

Selecting the matching model with the highest matching coefficient as the first illumination model.

Preferably, after querying a model-parameter list, the method further comprises:

When no illumination model matched with the first illumination model is found, storing the first illumination model and generating a record; and When the records of the first illumination model reach a preset threshold, setting corresponding adjustment parameters for the first illumination model, and adding the adjustment parameters to the model-parameter list.

Preferably, the method further comprises:

Calculating the chromatic value of each environmental sub-image to obtain the chromaticity of the environmental sub-image;

Extracting three components of the chromatic value according to the chromaticity of the environmental sub-image, wherein the three components of the chromatic value include a red component, a blue component and a green component in RGB color values; and Summing the components of the chromatic values of all the environmental sub-images to get a total chromatic value of each component and a total chromatic value of all the components of the environmental image.

Further preferably, the method further comprises:

Calculating the ratio coefficients of the red component, the blue component and the green component based on the total chromatic value;

Looking up the correction parameters corresponding to the red component, the blue component and the green component;

Taking the product of the ratio coefficient of the red component and the correction parameter of the red component as a first coefficient correction parameter of the red component;

Taking the product of the ratio coefficient of the green component and the correction parameter of the green component as a second coefficient correction parameter of the green component;

Taking the product of the ratio coefficient of the blue component and the correction parameter of the blue component as a third coefficient correction parameter of the blue component; and Correcting the first adjustment parameter according to the first coefficient correction parameter, the second coefficient correction parameter and the third coefficient correction parameter, and adjusting the display parameters of a display screen of a user terminal and/or adjusting the light compensation output parameters of a lighting compensation device according to the corrected first adjustment parameter, so that the display parameters of the display screen match an illumination state of the background environment in the viewing angle range of the user.

Further preferably, the method further comprises: calling a first sensitivity parameter, a second sensitivity parameter and a third sensitivity parameter corresponding to the red component, the green component and the blue component respectively;

Taking the product of the ratio coefficient of the red component and the correction parameter of the red component as a first coefficient correction parameter of the red component taking the product of the ratio coefficient of the green component and the correction parameter of the green component as a second coefficient correction parameter of the green component taking the product of the ratio coefficient of the blue component and the correction parameter of the blue component as a third coefficient correction parameter of the blue component specifically comprises:

Taking the product of the ratio coefficient of the red component, the correction parameter of the red component and the first sensitivity parameter as a first sensitization coefficient correction parameter of the red component; taking the product of the ratio coefficient of the green component, the correction parameter of the green component and the second sensitivity parameter as a second sensitization coefficient correction parameter of the green component; and taking the product of the ratio coefficient of the blue component, the correction parameter of the blue component and the third sensitivity parameter as a third sensitization coefficient correction parameter of the blue component;

Correcting the first adjustment parameter according to the first coefficient correction parameter, the second coefficient correction parameter and the third coefficient correction parameter specifically comprises: correcting the first adjustment parameter according to the first sensitization coefficient correction parameter, the second sensitization coefficient correction parameter and the third sensitization coefficient correction parameter.

Wherein the first sensitivity parameter is specifically a first standardized sensitivity parameter or a first personalized sensitivity parameter, the second sensitivity parameter is specifically a second standardized sensitivity parameter or a second personalized sensitivity parameter, and the third sensitivity parameter is specifically a third standardized sensitivity parameter or a third personalized sensitivity parameter; and When a correction ratio of the first adjustment parameter exceeds a set ratio, the method further comprises:

Updating the correction parameters corresponding to the red component, the blue component and the green component according to the first sensitization coefficient correction parameter, the second sensitization coefficient correction parameter and the third sensitization coefficient correction parameter.

The purpose of the present disclosure is to provide an output parameter adjustment method employing an ambient light distribution field to overcome the defects of the prior art, which can realize output parameter adjustment employing an ambient light distribution field after analyzing and processing the illumination of pixel points/pixel blocks of a background image.

BRIEF DESCRIPTION OF THE DRAWINGS

FIG. 1 is a flowchart of an output parameter adjustment method employing an ambient light distribution field according to an embodiment of the present disclosure.

DETAILED DESCRIPTION OF THE DISCLOSURE

The technical solution of the present disclosure will be described in further detail with reference to the drawings and embodiments.

The embodiment of the present disclosure provides an output parameter adjustment method employing an ambient light distribution field, which is used to adjust the display parameters of a display screen of a user terminal and/or adjust the light compensation output parameters of a lighting compensation device based on the background environment in a viewing angle of a user, so that the display parameters of the display screen match an illumination state of the background environment in the viewing angle range of the user.

When the user watches the display screen, the background environment has a great influence on the visual effect of the display screen. When human eyes watches an object, the size of the pupils adapts to the illumination level of the object, and the size of the display screen accounts for less than 10% of the visual range.

For example, when a mobile phone with a 5-inch display screen is used normally, the display screen of the mobile phone occupies less than 2% of the visual range of human eyes. For another example, when a computer with a 20-inch display screen is used, the display screen occupies less than 6% of the visual range of human eyes.

Therefore, in different external environments, if the display screen can be adjusted and displayed according to the display parameters such as illumination and color temperature of the external environment, especially the environment in the user's viewing angle, the visual health of the user can be protected to a certain extent.

The equipment on which the above display screen is mounted can be collectively referred to as an information terminal, which can specifically include, but is not limited to, smart phones, personal digital assistants (PAD), desktop computers, televisions and projectors.

The adaptive adjustment method employing an ambient employing an ambient light distribution field can be applied to various visual environments, which is specifically described as follows:

1. The user uses an electronic device with a screen, such as mobile terminal (cell phone), television or display. According to the present disclosure, two types of adjustment can be made by analyzing the illumination of a background image of the user, the first one is to adjust the illumination of the display according to the illumination of the background image, and the second one is to adjust the illumination of the background image according to the illumination of the display.

2. The user does not use an electronic device with a screen but can use the electronic device to collect a background image, and adjust the illumination of the background image as needed.

FIG. 1 is a flowchart of an output parameter adjustment method employing an ambient light distribution field provided by the present disclosure. As shown in the FIGURE, the present disclosure specifically comprises the following steps:

Step 101, acquiring an environmental image of a background environment in a viewing angle range of a user.

Specifically, there are many ways to acquire the image of the background environment. In the present embodiment, the background image data of the background environment in the viewing angle range of the user can be obtained by directly shooting with a camera. In the present embodiment, the background image data of the background environment in the viewing angle range of the user may be acquired by other devices and sent to a user terminal.

It should be noted that the size of the background image can be consistent with the current visual field range of the user, that is, the visual field of the user's current viewing angle; preferably, the background image is larger than the visual field of the user, that is, the image of the background environment acquired within the possible viewing angle range of the user is as complete as possible. The reason is that the user's head or eyes may move, making the size of the background image consistent with the possible viewing angle range of the user, that is, larger than the current viewing angle of the user.

In the output parameter adjustment method employing an ambient light distribution field in the embodiment of the present disclosure, there is no special requirement for the definition of the background image, because what is most needed is the illumination field information of the background image, and the definition is not particularly concerned, that is to say, the image definition may be large or small.

Step 102, dividing the environmental image according to preset partitioning to obtain environmental sub-images.

Specifically, this step comprises:

Acquiring image partitioning parameters because the environmental image can be partitioned by different methods as needed, wherein the so-called partitioning is to divide the environmental image into different blocks.

Dividing the environmental image according to the image partitioning parameters.

Wherein there are many partitioning ways, the most refined partitioning way is based on pixels, and the whole environmental image can also be divided into 2×2, 5×8 or 12×20 blocks. the definition of the image is not considered for partitioning, that is, the background image is partitioned regardless of the number of pixels, and the same blocks can have different numbers of pixels due to different image definitions.

Determining a corresponding model-parameter list according to the image partitioning parameters. (The corresponding model-parameter list are different for different partitioning ways.)

Because the partitioning modes and the quantities of blocks are different, each partitioning mode can correspond to a model-parameter list. When the image partitioning parameters are obtained, the model-parameter list corresponding to the image partitioning parameters can be obtained for subsequent use.

Step 103, calculating the illumination value of each environment sub-image to obtain the illumination of the environment sub-image.

After partitioning the background image into blocks, each block is an environmental sub-image.

Generally, the images acquired by existing image acquisition equipment are all digitized images, so the pixel information of each pixel in the image can be obtained, such as the YUV value of the pixel or the RGB value of the pixel. The illumination value of the environmental sub-image can be calculated from the value of each pixel, for example, the average value of RGB or YUV of the environmental sub-image.

Specifically, there are many ways to get the illumination information of pixels, such as direct extraction. If the pixel is calibrated or expressed by the YUV value, the Y value is used as the illumination value of the pixel. As for the environmental sub-image, if the YUV value of the pixel block is obtained in the previous step, the average Y value or the total Y value of the pixels is used as the illumination value of the environmental sub-image.

The illumination information of the pixel can also be obtained by conversion. If the pixel is calibrated by the RGB value, the illumination value can be obtained by the RGB value. For example, the YUV value is obtained by various calculations based on the RGB value, and the Y value is taken as the illumination value of the pixel. In the same way, the average illumination value or the total illumination value of the pixels is used as the illumination value of the environmental sub-image.

Step 104, splicing the illumination of all of the environmental sub-images to obtain distributed illumination distribution information corresponding to the environmental image.

Specifically, when the illumination value of each environmental sub-image of the environmental image is obtained, the illumination values of the environmental sub-images can be spliced to obtain the illumination field information of the whole environmental image.

Different environmental image partitioning methods result in different illumination field information of the environmental sub-images, because different block dividing methods result in different environmental sub-images. One of the differences is the fineness. The more blocks, that is, the more environmental sub-images, the higher the fineness, and vice versa.

In addition, when images are collected, there may be some deviation between the range of collected images and the visual field range of human eyes, and the visual field range of human eyes is usually larger than the range of an image collected by a camera. In order to solve this problem, the collected images can be spliced, so that the illumination field information of the spliced background image is basically consistent with or adaptive to the background environment in the viewing angle range of the user.

Step 105, matching on preset illumination models according to the illumination distribution information illumination to obtain a first illumination model corresponding to the illumination distribution information.

Different types of illumination field models are obtained by summarizing and analyzing various illumination field distributions. This model can be dynamic, that is, the number of models can be fixed and can be added, for example, manually added, or when a certain number of similar illumination field models are found, a new illumination field model can be generated.

Users can even customize their own illumination field models according to their own preferences.

Specifically, after obtaining the illumination field information of the current background image, the matching degree with a preset illumination field model can be calculated, so as to obtain a corresponding first illumination field model.

Optionally, matching on the preset illumination field models according to the illumination field information of the background image illumination to obtain one or more matching models and matching coefficients.

Because it is impossible for every illumination field distribution to be completely consistent with the illumination field model, if the illumination field distribution is completely consistent with the illumination field model, only one illumination field matching model can be obtained, and the matching coefficient is 100%. Under normal circumstances, one illumination field distribution may be matched with multiple illumination field models, so after matching calculation, multiple illumination field models can be obtained from one illumination field distribution, and each illumination field model also has its own matching coefficient, as shown in Table 1.

| No. | Reference sign of illumination matching model | Matching coefficient (%) |
| --- | --- | --- |
| 1 | 103 | 70 |
| 2 | 214 | 20 |
| 3 | 357 | 10 |

Then model correction calculation is conducted based on each matching model and matching coefficient to obtain the first illumination model.

There are many ways to obtain the first illumination field model by means of different matching models, which will be described in detail below.

In a first way, a matching model with the highest matching coefficient is determined as a model to be corrected, and deviation correction calculation is conducted on the model to be corrected according to other models, except the matching model to be corrected, of the plurality of matching models and corresponding matching coefficients to obtain the first illumination model.

Specifically, the illumination matching model 103 is taken as the model to be corrected, then the illumination matching model 214 is used for 20% deviation correction calculation, and the illumination matching model 357 is used for 10% deviation correction calculation, so that the first illumination field model is obtained by means of the matching model 103.

In a second way, the model parameters of the matching models are weighted according to the matching coefficients to obtain weighted model parameters, and the first illumination field model is generated according to the weighted model parameters.

Specifically, as shown in Table 1, the matching coefficient 70% of the illumination matching model 103 is taken as the weighting coefficient, the matching coefficient 20% of the illumination matching model 214 is taken as the weighting coefficient, and the matching coefficient 10% of the illumination matching model 357 is taken as the weighting coefficient, thus obtaining the first illumination field model.

In a third way, the matching model with the highest matching coefficient is selected as the first illumination field model.

The illumination matching model 103 has a matching coefficient of 70%, which is the highest matching coefficient, so this illumination model is taken as the first illumination field model.

Step 106, querying a model-parameter list which records adjustment parameters corresponding to the illumination models to obtain a first adjustment parameter corresponding to the first illumination model.

Specifically, the model-parameter list records the illumination field models and the corresponding adjustment parameters, and the corresponding relationship between them.

The number of the illumination field models is limited, or illumination field models can be added dynamically, manually or automatically.

The corresponding adjustment parameters are the adjustment parameters corresponding to this illumination field model. There are two types of adjustment parameters, one is display parameters, and the other is the light compensation output parameters of the lighting compensation device.

Particularly, when no illumination model matched with the first illumination field model can be found, the first illumination field model is stored and a record is generated;

and when the records of the first illumination model reach a preset threshold, corresponding adjustment parameters are set for the first illumination model and added to the model-parameter list.

That is to say, when a certain illumination field model appears multiple times, it is considered that this illumination field model often appears. After being optimized, the illumination field model is added to the model-parameter list as a standard illumination field model, and an adjustment parameter is given to the illumination field model.

Step 107, adjusting the display parameters of a display screen of a user terminal and/or adjusting the light compensation output parameters of a lighting compensation device according to the first adjustment parameter, so that the display parameters of the display screen match an illumination state of the background environment in the viewing angle range of the user.

According to the first adjustment parameter, the display screen can be adjusted, or light compensation adjustment is conducted on the lighting compensation device to match background light with required light.

It should be noted that the above adjustment mode does not consider the adjustment of the sensitivity of the user to the color of the background image, because human eyes are sensitive to color besides illumination, and specific processing is as follows:

Calculating the chromatic value of each environmental sub-image to obtain the chromaticity of the environmental sub-image; extracting three components of the chromatic value according to the chromaticity of the environmental sub-image, wherein the three components of the chromatic value include a red component, a blue component and a green component in RGB color values; and summing the components of the chromatic values of all the environmental sub-images to get a total chromatic value of each component and a total chromatic value of all the components of the environmental image.

Specifically, after the data of the environmental sub-image is obtained, the RGB color value of the environmental sub-image is obtained through chromaticity statistics, and then the components of the RGB values of all the environmental sub-images are summed to obtain the total chromatic value $\Sigma R$ of the red R value component, the total chromatic value $\Sigma G$ of the green G value component and the total chromatic value $\Sigma B$ of the blue B value component of the environmental image, and the total chromatic value $\Sigma = \Sigma R + \Sigma G + \Sigma B$.

The ratio coefficients of the red component, the blue component and the green component are calculated based on the total chromatic value.

Specifically, the ratio coefficient of the red component is $CR = \Sigma R / \Sigma$, the ratio coefficient of the green component is $CG = \Sigma G / \Sigma$, and the ratio coefficient of the red component is $CB = \Sigma B / \Sigma$.

The correction parameters corresponding to the red component, the blue component and the green component are looked up.

Specifically, because the levels of sensitivity of people to illumination caused by different colors are different, each color has its own correction parameter T, which is TR for red, TG for green and TB for blue. Generally speaking, the level of sensitivity towards red is the highest, so red corresponds to the largest correction parameter; the level of sensitivity towards blue is the lowest, so blue corresponds to the smallest correction parameter; and the correction parameter of green lies therebetween.

The product of the ratio coefficient of the red component and the correction parameter of the red component is taken as a first coefficient correction parameter of the red component, that is, the first coefficient correction parameter $CTR = CR \times TR$;

The product of the ratio coefficient of the green component and the correction parameter of the green component is taken as a second coefficient correction parameter of the green component, that is, the second coefficient correction parameter is $CTG = CG \times TG$;

The product of the ratio coefficient of the blue component and the correction parameter of the blue component is taken as a third coefficient correction parameter of the blue component, that is, the third coefficient correction parameter is $CTB = CB \times TB$; and The first adjustment parameter is corrected according to the first coefficient correction parameter, the second coefficient correction parameter and the third coefficient correction parameter, and the display parameters of a display screen of a user terminal and/or the light compensation output parameters of a lighting compensation device are adjusted according to the corrected first adjustment parameter, so that the display parameters of the display screen match an illumination state of the background environment in the viewing angle range of the user.

In a preferred solution, the first adjustment parameter is obtained after the above step 106, which is an adjustment parameter without considering color. Now that we have different coefficient correction parameters CTR, CTG and CTB of three-color components, we can correct the first adjustment parameter, so as to obtain the corrected first adjustment parameter which suits the habit of human eyes more. For example, human eyes are sensitive to red R, so when the R value component of the background environment is large, the illumination value will be considered high. In this case, the illumination value of the display parameters of the display screen can be increased to match the background environment. Therefore, when the illumination of the display screen is adjusted according to the CTR value, the first adjustment parameter should be raised. On the contrary, when the first adjustment parameter is to adjust the light compensation output of the lighting compensation device for background light, it can be considered that the background light is already strong enough, and the intensity of the background light only needs to be adjusted slightly.

The above-mentioned adjustment process takes the general population's sensitivity to color into account but does not consider personalized color sensitivity. The present disclosure can also consider the degree of personalized color sensitivity when adjusting and correcting the display parameters. Specific processing is as follows:

Calling a first sensitivity parameter MR, a second sensitivity parameter MG and a third sensitivity parameter MB corresponding to the red component, the green component and the blue component respectively.

The above-mentioned specific processing can be specifically:

The product of the ratio coefficient of the red component, the correction parameter of the red component and the first sensitivity parameter is taken as a first sensitization coefficient correction parameter of the red component, that is, the first sensitization coefficient correction parameter is $MCTR = MR \times CR \times TR$;

The product of the ratio coefficient of the green component, the correction parameter of the green component and the second sensitivity parameter is taken as a second sensitization coefficient correction parameter of the green component, that is, the second sensitization coefficient correction parameter is MCTG=MG×CG×TG;

The product of the ratio coefficient of the blue component, the correction parameter of the blue component and the third sensitivity parameter is taken as a third sensitization coefficient correction parameter of the blue component, that is, the third sensitization coefficient correction parameter is MCTB=MB×CB×TB;

Then the first adjustment parameter is corrected according to the first sensitization coefficient correction parameter, the second sensitization coefficient correction parameter and the third sensitization coefficient correction parameter;

Similarly, the first adjustment parameter is obtained after the above step 106, which is an adjustment parameter without considering color. Now that we have different sensitization coefficient correction parameters MCTR, MCTG and MCTB of three-color components, we can correct the first adjustment parameter, so as to obtain the corrected first adjustment parameter which suits the habit of personalized human eyes more. For example, human eyes are sensitive to red R, so when the R value component of the background environment is large, the illumination value will be considered high. In this case, the illumination value of the display parameters of the display screen can be increased. Because different persons/populations have different sensitivity levels to the illumination of red, the increase degree is determined according to the personalization of a person/population, so as to match the background environment. Therefore, when the illumination of the display screen is adjusted according to the MCTR value, the first adjustment parameter should be raised in a personalized manner. On the contrary, when the first adjustment parameter is to adjust the light compensation output of the lighting compensation device for background light, it can be considered that the background light is already strong enough, and the intensity of the background light only needs to be adjusted slightly. The adjustment degree is determined by the sensitivity of different persons/populations.

Therefore, the first sensitivity parameter is specifically a first standardized sensitivity parameter or a first personalized sensitivity parameter, the standardized sensitivity parameter is based on statistics of all people or a certain type of people, and the personalized sensitivity parameter is a certain user's personalized sensitivity parameter, which can be recorded based on the user's ID. Similarly, the second sensitivity parameter is specifically a second standardized sensitivity parameter or a second personalized sensitivity parameter, and the third sensitivity parameter is specifically a third standardized sensitivity parameter or a third personalized sensitivity parameter.

According to big data processing and statistical principles, when the personalized sensitivity parameters of many people are directed towards the same direction or their trend values are similar, the coefficient correction parameter CT can be adjusted to approach the personalized correction parameter MCT, so that there is less personalized adjustment, that is, when the correction ratio of the first adjustment parameter exceeds a set ratio, the method also comprises: updating the correction parameters corresponding to the red component, the blue component and the green component according to the first sensitization coefficient correction parameter, the second sensitization coefficient correction parameter and the third sensitization coefficient correction parameter.

The output parameter adjustment method employing an ambient light distribution field analyzes the illumination of the background image based on the illumination information of the environmental sub-images of the environmental image, thus having the following advantages:

1. The background environmental image based on the user is a visual field directly facing the user's eyes, so it can truly reflect the illumination of the use environment.

2. Because the analysis of the environmental image can be larger than the visual field of the user, the whole situation of the current use environment can be reflected, and the illumination of the display of the electronic device or the light compensation output parameters of the lighting compensation device can be adjusted based on the illumination analysis of the whole background image.

Therefore, after the user uses the method of the present disclosure to adjust the illumination of the display of the electronic device or compensate or adjust the illumination by using the lighting compensation device, the eyes of the user feel very comfortable when the electronic device is used, thereby protecting the eyes and vision of all users.

Professionals should further realize that the units and algorithm steps of each example described in connection with the embodiments disclosed herein can be implemented in electronic hardware, computer software or a combination of the two. In order to clearly explain the interchangeability of hardware and software, the components and steps of each example have been generally described according to functions in the above description. Whether these functions are implemented in hardware or software depends on the specific application and design constraints of the technical scheme. Professionals can use different methods to implement the described functions for each specific application, but such implementation should not be considered beyond the scope of the disclosure.

The steps of a method or algorithm described in connection with the embodiments disclosed herein may be implemented in hardware, a software module executed by a processor, or a combination of the two. The software module can be placed in a random-access memory (RAM), memory, read-only memory (ROM), electrically programmable ROM, electrically erasable programmable ROM, register, hard disk, removable magnetic disk, CD-ROM, or storage media known in the technical field.

The above-mentioned specific embodiments further explain the purpose, technical scheme and beneficial effects of the present disclosure in detail. It should be understood that the above embodiments are only specific ones of the present disclosure and are not used to limit the scope of protection of the present disclosure. Any modification, equivalent substitution, improvement, etc. made within the spirit and principles of the present disclosure should be included in the scope of protection of the present disclosure.

What is claimed is:

1. An output parameter adjustment method employing an ambient light distribution field, characterized in that the method comprises:

acquiring an environmental image of a background environment in a viewing angle range of a user;

dividing the environmental image according to preset partitioning to obtain environmental sub-images;

calculating an illumination value of each of the environmental sub-images to obtain the illumination of the environmental sub-image;

splicing the illumination of all of the environmental sub-images to obtain distributed illumination distribution information corresponding to the environmental image;

matching on preset illumination models according to the illumination distribution information to obtain a first illumination model corresponding to the illumination distribution information;

querying a model-parameter list which records adjustment parameters corresponding to the illumination models to obtain a first adjustment parameter corresponding to the first illumination model; wherein after querying a model-parameter list the method further comprises:

when no illumination model matched with the first illumination model is found, storing the first illumination model and generating a record; and when the records of the first illumination model reach a preset threshold, setting corresponding adjustment parameters for the first illumination model, and adding the adjustment parameters to the model-parameter list; and adjusting display parameters of a display screen of a user terminal and/or adjusting light compensation output parameters of a lighting compensation device according to the first adjustment parameter, so that the display parameters of the display screen match an illumination state of the background environment in the viewing angle range of the user.

2. The output parameter adjustment method employing an ambient light distribution field according to claim 1, characterized in that dividing the environmental image according to preset partitioning specifically comprises:

acquiring image partitioning parameters;
dividing the environmental image according to the image partitioning parameters; and
determining a corresponding model-parameter list according to the image partitioning parameters.

3. The output parameter adjustment method employing an ambient light distribution field according to claim 1, characterized in that matching on preset illumination models according to the illumination distribution information illumination to obtain the first illumination model corresponding to the illumination distribution information specifically comprises:

matching on the preset illumination models according to the illumination distribution information to obtain one or more matching models and matching coefficients; and
performing model correction calculation based on each of the matching models and matching coefficients to obtain the first illumination model.

4. The output parameter adjustment method employing an ambient light distribution field according to claim 3, characterized in that performing model correction calculation based on each of the matching models and matching coefficients to obtain the first illumination model specifically comprises:

determining a matching model with a highest matching coefficient as a model to be corrected; and
conducting deviation correction calculation on the model to be corrected according to other models, except the matching model to be corrected, of the plurality of matching models and corresponding matching coefficients to obtain the first illumination model.

5. The output parameter adjustment method employing an ambient light distribution field according to claim 3, characterized in that performing model correction calculation based on each of the matching models and matching coefficients to obtain the first illumination model specifically comprises:

weighting the model parameters of the matching models according to the matching coefficients to obtain weighted model parameters; and
generating the first illumination model according to the weighted model parameters.

6. The output parameter adjustment method employing an ambient light distribution field according to claim 3, characterized in that performing model correction calculation based on each of the matching models and matching coefficients to obtain the first illumination model specifically comprises:

selecting the matching model with a highest matching coefficient as the first illumination model.

7. The output parameter adjustment method employing an ambient light distribution field according to claim 1, characterized in that the method further comprises:

calculating a chromatic value of each of the environmental sub-images to obtain the chromaticity of the environmental sub-image;
extracting three components of the chromatic value according to the chromaticity of the environmental sub-image, wherein the three components of the chromatic value include a red component, a blue component and a green component in RGB color values; and
summing the components of the chromatic values of all the environmental sub-images to get a total chromatic value of each component and a total chromatic value of all the components of the environmental image.

8. The output parameter adjustment method employing an ambient light distribution field according to claim 7, characterized in that the method further comprises:

calculating ratio coefficients of the red component, the blue component and the green component based on the total chromatic value;
looking up correction parameters corresponding to the red component, the blue component and the green component;
taking the product of the ratio coefficient of the red component and the correction parameter of the red component as a first coefficient correction parameter of the red component;
taking the product of the ratio coefficient of the green component and the correction parameter of the green component as a second coefficient correction parameter of the green component;
taking the product of the ratio coefficient of the blue component and the correction parameter of the blue component as a third coefficient correction parameter of the blue component; and
correcting the first adjustment parameter according to the first coefficient correction parameter, the second coefficient correction parameter and the third coefficient correction parameter, and adjusting display parameters of a display screen of a user terminal and/or adjusting light compensation output parameters of a lighting compensation device according to the corrected first adjustment parameter, so that the display parameters of the display screen match an illumination state of the background environment in the viewing angle range of the user.

9. The output parameter adjustment method employing an ambient light distribution field according to claim 8, characterized in that the method further comprises: calling a first sensitivity parameter, a second sensitivity parameter and a third sensitivity parameter corresponding to the red component, the green component and the blue component respectively;

taking the product of the ratio coefficient of the red component and the correction parameter of the red component as a first coefficient correction parameter of the red component; taking the product of the ratio coefficient of the green component and the correction parameter of the green component as a second coefficient correction parameter of the green component; taking the product of the ratio coefficient of the blue component and the correction parameter of the blue component as a third coefficient correction parameter of the blue component specifically comprises:

taking the product of the ratio coefficient of the red component, the correction parameter of the red component and the first sensitivity parameter as a first sensitization coefficient correction parameter of the red component; taking the product of the ratio coefficient of the green component, the correction parameter of the green component and the second sensitivity parameter as a second sensitization coefficient correction parameter of the green component; and taking the product of the ratio coefficient of the blue component, the correction parameter of the blue component and the third sensitivity parameter as a third sensitization coefficient correction parameter of the blue component;

correcting the first adjustment parameter according to the first coefficient correction parameter, the second coefficient correction parameter and the third coefficient correction parameter specifically comprises: correcting the first adjustment parameter according to the first sensitization coefficient correction parameter, the second sensitization coefficient correction parameter and the third sensitization coefficient correction parameter;

wherein the first sensitivity parameter is specifically a first standardized sensitivity parameter or a first personalized sensitivity parameter, the second sensitivity parameter is specifically a second standardized sensitivity parameter or a second personalized sensitivity parameter, and the third sensitivity parameter is specifically a third standardized sensitivity parameter or a third personalized sensitivity parameter; and when a correction ratio of the first adjustment parameter exceeds a set ratio, the method further comprises:

updating the correction parameters corresponding to the red component, the blue component and the green component according to the first sensitization coefficient correction parameter, the second sensitization coefficient correction parameter and the third sensitization coefficient correction parameter.

* * * * *